(No Model.)
J. B. WOOD.
DRAFT HOOK FOR VEHICLES.
No. 375,859. Patented Jan. 3, 1888.
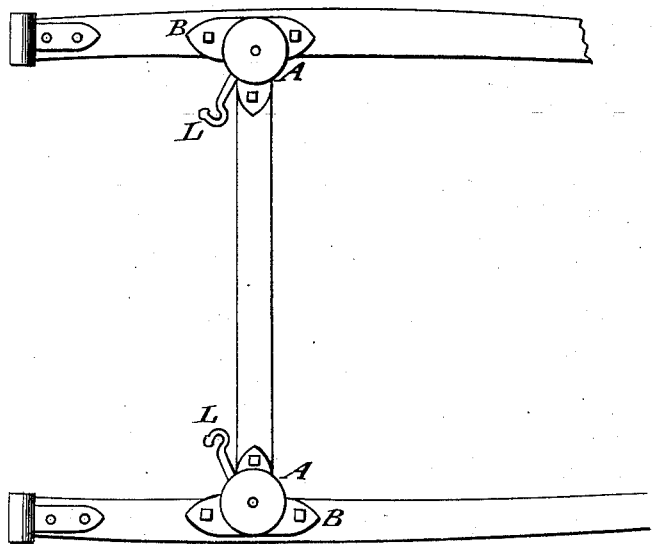
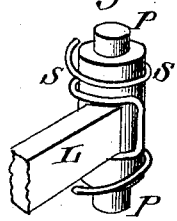
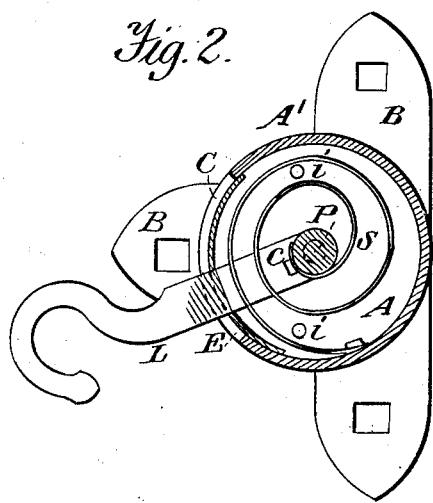
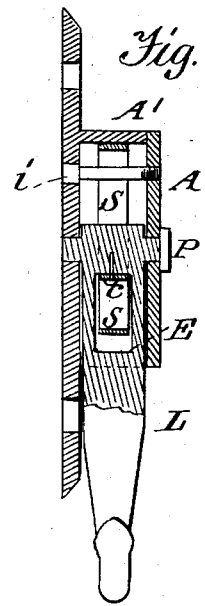
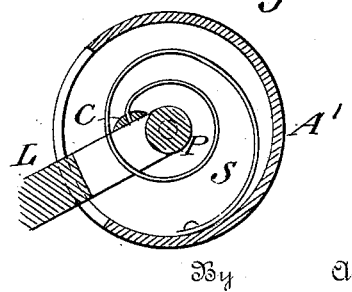
Witnesses
A. Ruppert
H. A. Daniels
Inventor
Julia B. Wood
Per
Attorney Thomas P. Simpson

UNITED STATES PATENT OFFICE.

JULIA BEARD WOOD, OF MANCHESTER, NEW HAMPSHIRE.

DRAFT-HOOK FOR VEHICLES.

SPECIFICATION forming part of Letters Patent No. 375,859, dated January 3, 1888.

Application filed March 16, 1887. Serial No. 231,211. (No model.)

*To all whom it may concern:*

Be it known that I, JULIA BEARD WOOD, of Manchester, county of Hillsborough, and State of New Hampshire, have invented certain new and useful Improvements in Draft-Hooks for Vehicles; and I hereby declare the following to be a full, clear, and exact description thereof, reference being had to the accompanying drawings, which form a part of this specification.

My invention relates to that class of devices which have for their object to produce elasticity of tension of draft on a vehicle, preventing sudden jars over rough roads; and it consists in attaching to a thill or cross-bar, or, what is still better, to the T-brace, which is usually found bolted to the thill and cross-bar at the junction thereof, a hollow receptacle or case, within which is a lever-shaft pivoted at each end, which fits corresponding depressions within the case when adjusted ready for use. Near the center of said shaft is attached the lever, which projects through a slot in the side of the case, and to which the tug or other attachment to the harness is secured. Within the case, and attached to the walls thereof, is a spring which coils itself around the lever-shaft in the same or similar manner to that of a mainspring of a clock or watch around its shaft within the barrel, and the automatic motion thereof, when the carriage is in motion on the road, will be the same or similar to the operation of the balance-wheel staff of a watch, rotating on its pivots within the jewels, the holes in those jewels corresponding to the depressions within the case of this device. The spring surrounding the shaft, as before observed, is attached thereto, or to the lever near its junction therewith, in any suitable manner, some of which will be more fully described, and represented by drawings hereto annexed.

Figure 1 is a sectional plan view of my invention and its application to the thills and cross-bar of a vehicle ready for use. Fig. 2 represents a horizontal sectional view of same with cap A removed, showing the internal arrangement of the spring, its attachments to case A', and one way it may be attached to lever-shaft L, for purposes hereinafter explained. Fig. 3 is a cross-section thereof, showing the position of pivots P P with reference to case A', and the manner of fastening the case-cap A on case A' by means of machine bolts or screws, (shown at *i*.) Fig. 4 shows another manner of attaching the spring to the lever for the same purpose. Fig. 5 represents still another way of combining and attaching a coiled spring with and to the lever-shaft to accomplish the same result (and with the same principle) for which this device is designed.

The case A', with its cover or cap A, represent a hollow receptacle, which on the interior surface is provided with holes or depressions for the reception of pivots P P, and others for screws or machine-bolts, with which, when properly adjusted, the parts of the case are fastened together. The spring is to be made of steel or other suitable material, and if flat to be about the same width as the case is deep, and of sufficient thickness for the strength and force required. The inner coil of the spring may be provided with a loop through the end thereof, and through which to pass the lever, thereby combining the spring with the lever shaft when adjusted for use; or it may be combined with the lever-shaft by means of screws, as shown in Fig. 2, by clutch-spur, or in any other suitable manner to effect the same result desired, including the way shown in Fig. 4, where, as will be seen, the inner end of the spring drops into a depression in the lever near its junction with the shaft, and the same result is attained.

If a wire spring be used, a loop may be formed in the center thereof, through which the lever may pass, combining it with the shaft, to secure the same result, as shown in Fig. 5. The outer ends of the spring may be attached to the inner walls of the case in any suitable manner. The cap A is now fastened thereon and the whole bolted to the shafts of the vehicle.

It is designed to have the lever shaft and lever L cast of one piece of steel, malleable iron, or other suitable material for utility and durability, and the case A' with T-brace B are also to be cast in one piece, of the same or similar material. There may be a rubber sleeve or tube placed on the lever-shaft, against which the spring is compressed, which will not only prevent any creaking noise therein, but will also increase the strength of tension. It is also designed to have a collar placed on lever L, just within the case, where it passes through the slot in its side, which will prevent mud, ice, or other substance entering the case to obstruct the free action of the spring within.

The operation of this device is simple, and it is obvious that the motion or contraction of the spring is slight, for the motion of the lever-shaft will not exceed a quarter-revolution with each motion of the horse to accomplish all that can be desired for purposes for which this device was designed.

This combination of case A', spring S, and lever-shaft L, arranged and provided with a few other appliances, will provide a cheaper, just as effectual, and more desirable side or end spring for wagons or children's carriages than any before used, which subject will receive due attention and consideration in future; but I make no claims on it for such purposes in this application.

I am aware that an elastic trace-connection between the harness and vehicle is not new; that the intervention of a spring attached to the thills or cross-bar of a vehicle in order to relieve the horse and carriage from the effects of sudden movements is old; and I am also aware that one Quinn obtained a patent on a device for draft purposes, in which he made use of a "cylindrical case or box," within which he placed an open spiral spring, the "one end resting against an abutment" and the other against the arm or lever to which his tug was attached, and with each motion of the horse the said spiral spring was compressed horizontally around a central rod, the lower end of which was triangular in form, passing through a metallic socket, which was screwed to the cross-bar of the vehicle. Said "shank" or rod was made a fixture within the case, and the inner outside edge of the spiral spring was forced around that shank in that cramped and impracticable manner with each motion of the horse, by means of the arm or lever compressing endwise the spiral spring around said shank or rod. Later on two other improvements were made on an end compression of a spiral spring with rigid attachments to thill or cross-bar of a vehicle, the one devised by Mead and the other by Heon.

My device is worked on a different principle. Instead of an endwise compression of a spiral spring, I use a horizontal lengthwise contraction of a coiled spring simultaneously with a rotary motion of the lever shaft on its pivots, as above described, and I claim no part of the Quinn device or the application of any other form of spiral spring with endwise compression for purposes for which my device is designed.

What I do claim, and desire to secure by Letters Patent, is—

In elastic trace-connections, a whiffletree-hook and spring combined with and attached to the same vibratory shaft, each coil of the spring passing around the shaft, as shown and described.

JULIA BEARD WOOD.

Witnesses:
R. O. WOOD,
A. G. DOW.